United States Patent [19]

Alphonsus

[11] Patent Number: 5,764,405
[45] Date of Patent: Jun. 9, 1998

[54] LOSSLESS OPTICAL TRANSMISSION SYSTEM ARCHITECTURE WITH NON-FAILING OPTICAL AMPLIFIERS

[75] Inventor: Justin E. Alphonsus, Howell, N.J.

[73] Assignee: Tyco Submarine Systems Ltd., Morristown, N.J.

[21] Appl. No.: 728,649

[22] Filed: Oct. 10, 1996

[51] Int. Cl.$^6$ .................................................. G01S 3/00
[52] U.S. Cl. ............................ 359/341; 359/180; 359/184
[58] Field of Search .............................. 359/341, 160, 359/180, 189, 115, 117, 110

[56] References Cited

U.S. PATENT DOCUMENTS 5,315,426  5/1994  Aoki ........................................ 359/180
5,561,553  10/1996  Marcerou et al. ....................... 359/341
5,570,218  10/1996  Sotom ..................................... 359/117

*Primary Examiner*—Mark Hellner
*Attorney, Agent, or Firm*—Mark K. Young

[57] ABSTRACT

Disclosed is a redundant TTE optical transmission system architecture which eliminates system signal power loss due to protection elements and thus provides a system power budget comparable to non-redundant TTE systems. Further disclosed is a virtually non-failing optical amplifier, for redundant and non-redundant optical systems, which allows for the simultaneous exploitation of the pump power from both sets of laser pumps in a dual-pump configuration, thereby increasing the available system power margin.

14 Claims, 3 Drawing Sheets

LOSSLESS OPTICAL TRANSMISSION SYSTEM ARCHITECTURE WITH NON-FAILING OPTICAL AMPLIFIERS

FIELD OF THE INVENTION

The present invention relates generally to optical transmission systems, and more specifically, to architectures for redundant and non-redundant terminal transmission equipment optical transmission systems employing optical amplifiers.

BACKGROUND OF THE INVENTION

In optical transmission system design, system reliability and minimization of system power loss are key concerns. To enhance reliability, redundant architectures are often employed. In conventional redundant terminal transmission equipment (TTE) systems, redundant transmitters and post-amplifiers are employed on the transmitting end of the system, while redundant pre-amplifiers and receivers are employed on the receiving end. Selection of a particular transmitter/post amplifier pair is made via a protection element, such as an optical switch, while an optical coupler is employed to distribute the optical signal to each pre-amplifier/receiver pair.

There is an insertion signal power loss, however, associated with protection elements, such as optical couplers and switches. For example, a typical optical switch might produce a 2.5 decibel (dB) power loss, while a typical optical coupler might produce a loss of 4.5 dB. In a conventional redundant TTE optical system employing such components, therefore, there is an approximately 7 dB tax on the system power budget attributable to the protection elements.

In addition, conventional redundant TTE optical transmission systems employing passive optical amplifiers with laser pumps do not take advantage of the additional power potentially available in the pre- and post amplifier pumps associated with the standby (i.e., redundant) transmission and reception paths.

It is desired, therefore, to provide a redundant TTE optical transmission system configuration which eliminates the system power loss caused by the protection elements (e.g., the optical switches and couplers) and which utilizes the power available from the laser pumps in the standby path to increase system power margin.

In conventional redundant TTE and non-redundant optical transmission systems, failure of a laser pump leads to the failure of the passive optical amplifier excited by the pump. In redundant systems, this necessitates switching to the standby transmission path, which causes a temporary transmission failure during the switching process. In non-redundant systems (i.e., systems with unprotected TTEs), failure of an optical amplifier causes an extended transmission failure, until pump repairs can be completed.

It is desired, therefore, to also provide an optical transmission system configuration with a virtually non-failing optical amplifier, i.e., a configuration in which the failure of a laser pump does not lead to transmission failure, whether momentary or for an extended period.

SUMMARY OF THE INVENTION

The present invention provides a redundant TTE optical transmission system architecture which eliminates system signal power loss due to the protection elements and thus provides a system power budget comparable to non-redundant TTE systems. In addition, the present invention employs fewer passive amplifier components than conventional redundant TTE optical transmission systems.

For both redundant TTE and non-redundant optical transmission systems, the present invention provides a virtually non-failing optical amplifier, and thus limits system failure to instances of TTE failure. Furthermore, the present invention allows for the simultaneous exploitation of the pump power from both sets of laser pumps in a dual-pump configuration, thereby increasing system power margin.

DETAILED DESCRIPTION

For redundant TTE optical transmission systems, the present invention provides an architecture wherein the protection elements are strategically placed so as to optimize transmission power budget. The present invention eliminates system signal power loss due to the protection elements, thus providing a system power budget comparable to non-redundant TTE systems. Additionally, the present invention provides a component cost savings as compared to conventional redundant TTE optical systems because it employs fewer amplifier components.

In both redundant TTE and non-redundant optical transmission systems, the present invention provides a virtually non-failing optical amplifier and thus limits system failure to instances of TTE failure. Furthermore, the present invention allows for the simultaneous exploitation of the pump power from both sets of laser pumps in a dual-pump configuration, thereby increasing the available system power margin.

Figure 1:
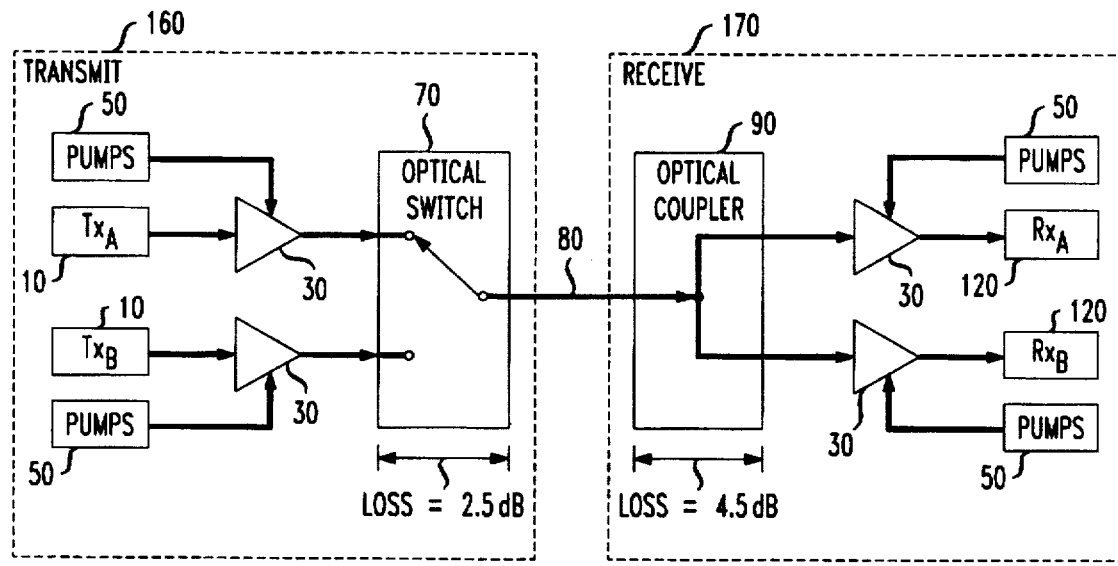
FIG. 1 depicts a conventional, redundant TTE optical transmission system architecture.

FIG. 1 depicts a conventional, redundant TTE optical transmission system. On the transmit side 160, an optical signal is routed through transmitter A 10 and post amplifier A 30 which is pumped by a set of laser pumps A 50. In case of a failure in path A (i.e., failure of transmitter A 10, post amplifier A 30, or pumps A 50), the optical signal is routed through path B, comprised of transmitter B 10, post amplifier B 30, and a set of laser pumps B 50. Switching between transmission paths A and B is performed by an optical switch 70.

Similarly, on the receive side 170, the optical signal is passed through an optical coupler 90, which distributes the signal to receive paths A and B, comprised of, respectively, pre-amplifier A 30 with laser pumps A 50 and receiver A 120, and pre-amplifier B 30 with pumps B 50 and receiver B 120. The optical signal is routed between the transmit 160 and receive 170 sides of the system over an optical fiber 80.

The optical switch 70 has an associated insertion signal power loss. In a conventional optical switch, this loss is, for example, 2.5 decibels. Thus, for example, if the post amplifiers A 30 and B 30 produce a 21 dBm output signal, the signal strength upon exiting the optical switch 70 is reduced to 18.5 dBm. Similarly, the optical coupler 90 causes a signal power loss which, in a typical optical coupler, might be approximately 4.5 dB. The sensitivity of the preamplified receivers 120 is therefore degraded by 4.5 dB.

In a conventional, redundant TTE optical transmission system, there is thus a tax of approximately 7.0 dB on the system power budget caused by the protection elements (i.e., the optical switch 70 and coupler 90). In addition, because there are separate optical amplifiers 30 and pumps 50 for each transmission path on the transmit side 160 and the receive side 170, the amplifier power in the standby path is not utilized. Furthermore, a failure in the optical amplifier 30, including a failure in the amplifier's associated pumps 50, in the active transmission path requires a switchover to the standby path, with an associated temporary transmission failure during the switchover.

Figure 2:
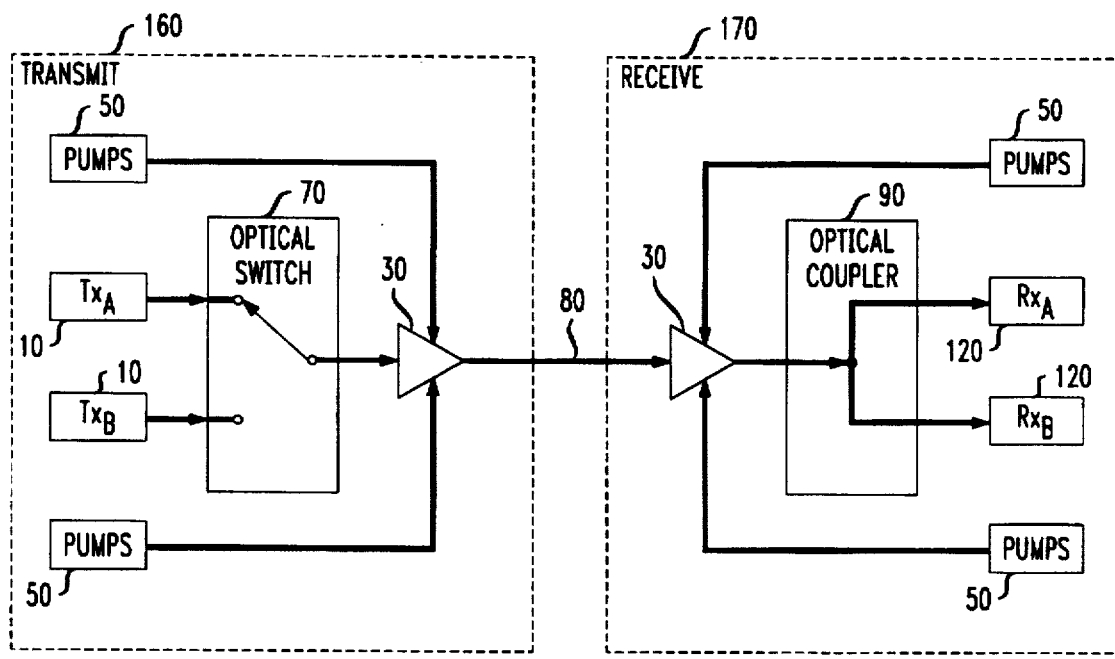
FIG. 2 depicts a redundant TTE optical transmission system architecture according to the present invention.

FIG. 2 depicts a lossless, redundant TTE optical transmission system configuration with non-failing optical amplifier according to the present invention. In this configuration, the protection elements are strategically placed to optimize transmission power budget. A single post amplifier 30 is positioned after the optical switch 70, which selects the desired transmitter 10 output. Because the post amplifier 30 operates in the saturation region with an input dynamic range of, for example, +3 dBm to −12 dBm, the 2.5 dB signal loss caused by the optical switch 70 does not affect the output power of the post amplifier 30.

Similarly, on the receive side, the optical signal is amplified by the preamplifier 30 prior to entering the optical coupler 90. Thus, the signal power is amplified prior to being attenuated by the optical coupler 90. As long as the preamplifier 30 provides adequate gain, the sensitivity of the receivers 120 is therefore not degraded by the, e.g., 4.5 dB signal loss imposed by the optical coupler 90.

In the optical transmission configuration depicted in FIG. 2, each amplifier 30 is capable of being simultaneously pumped by the laser pumps 50 from both transmission paths A and B. Thus, all available pump power in both paths can be utilized to improve the system power margin, and thereby reduce the system bit-error rate (BER). Using conventional laser pumps 50 and passive amplifier components 30, an additional gain of, e.g., 3 dB can be achieved by this double-pumping. Thus, for example, if a post amplifier 30 having a 21 dBm output with one set of pumps is utilized, the simultaneous use of an additional set of pumps 50 increases the amplifier 30 output to approximately 24 dBm. In order to overcome stimulated Brillouin scattering (SBS), however, a 3 dB increase in output power requires twice the transmission linewidth of that at 21 dBm.

If the post amplifier 30 and pre-amplifier 30 are comprised of passive components, the system configuration in FIG. 2 provides virtually non-failing optical amplifiers 30. Because they are passive, the amplifier components themselves cannot fail. Furthermore, because there is redundancy in the pump lasers 50, failure of one set of pump lasers 50 does not lead to failure of the associated optical amplifier 30. The likelihood of a simultaneous failure of both sets of laser pumps 50 is minuscule. Additionally, no transmission path switchover is needed in case of a pump laser 50 failure. Thus, failure of one set of laser pumps 50 does not lead to even a temporary transmission failure.

The optical transmission system configuration of FIG. 2 provides a cost savings over that depicted in FIG. 1 due to the elimination of one set of amplifier 30 components on both the transmit 160 and receive 170 sides of the transmission system.

In one embodiment of the present invention, 1550nanometer (nm) synchronous digital hierarchy (SDH), and/or SDH/ line terminating unit (LTU) transmission terminal elements (TTEs) are used, 1480 nm pump lasers are used on the transmit side, and 980 nm pump lasers are used on the receive side.

Figure 3:
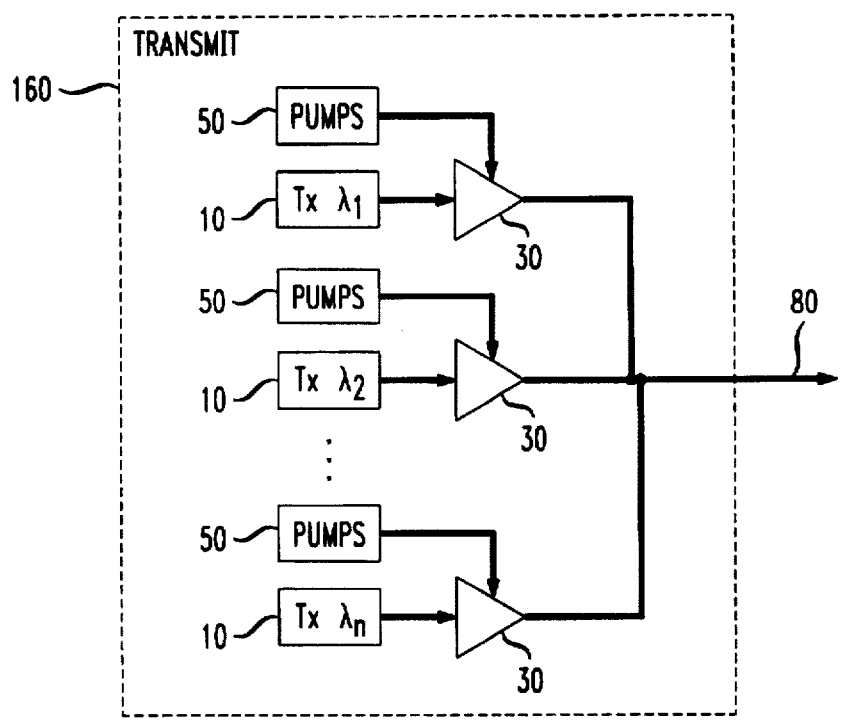
FIG. 3 depicts the transmission side configuration of a conventional, unprotected optical transmission system.

FIG. 3 depicts the transmission side configuration of a conventional, unprotected (i.e., non-redundant) optical transmission system. In a simple, unprotected TTE optical transmission system (i.e., a configuration according to FIG. 3 wherein n=1), only one transmitter 10, with associated amplifier 30 and pumps 50 is employed. In a wavelength division multiplexing (WDM) system, multiple transmitters 10, each outputting an optical signal of a different wavelength, are employed, each having an associated amplifier 30 and pump lasers 50.

In a simple, unprotected TTE system, failure of the pump lasers 50 leads to total transmission failure, until repairs can be made. In an unprotected WDM system, failure of a set of pumps 50 leads to failure of transmission at all wavelengths until the pumps are repaired.

Figure 4:
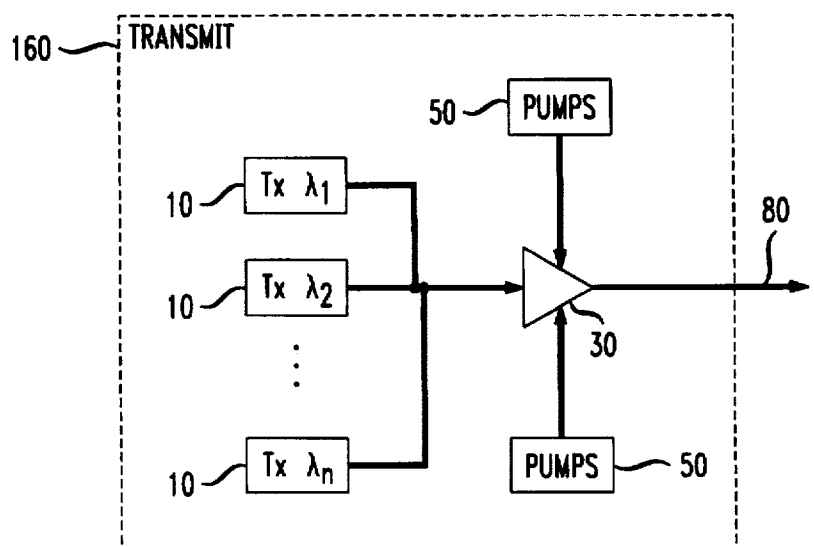
FIG. 4 depicts the transmission side configuration of an unprotected optical transmission system with non-failing optical amplifier according to the present invention.

FIG. 4 depicts the transmission side configuration of an unprotected optical transmission system with non-failing optical amplifier according to the present invention. As in the redundant TTE configuration according to the present invention, depicted in FIG. 2, a single, passive amplifier 30, is employed for transmission, with two sets of associated pump lasers 50. This pump redundancy provides for a virtually non-failing optical amplifier 30. That is, the optical amplifier 30 does not fail when one set of pumps 50 fails. Thus, optical amplifier 30 failure is limited to the rare circumstance where both sets of laser pumps 50 are inoperative simultaneously.

While both sets of pump lasers 50 are operative, the dual pumping of FIG. 4 provides for an increased system power margin (and thus a lower BER). For WDM configurations (i.e., configurations according to FIG. 4 wherein n>1), the present invention provides a component cost savings over conventional WDM systems, due to the reduced number of amplifiers 30 employed.

Figure 5:
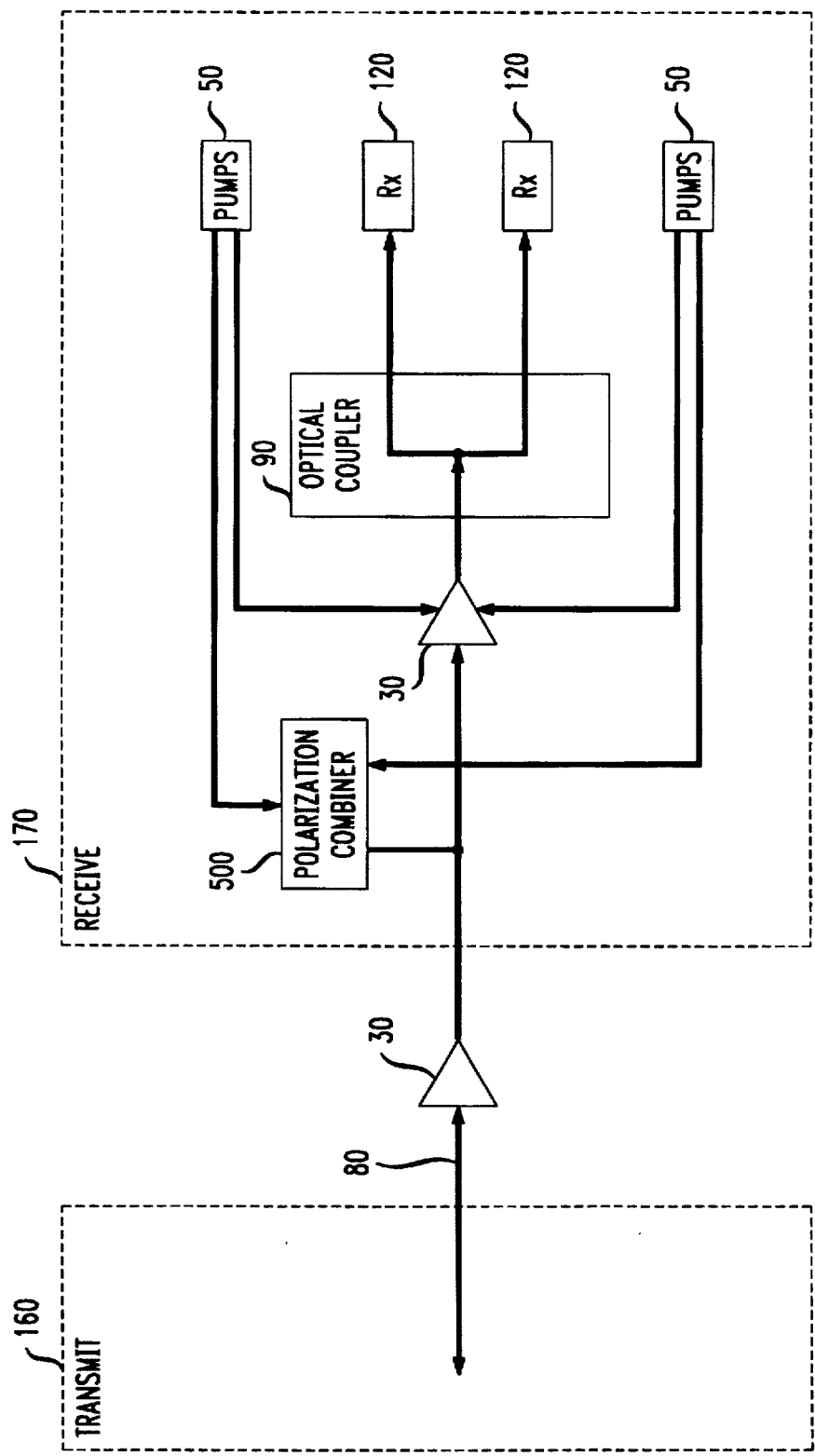
FIG. 5 depicts a remote amplification architecture with non-failing optical amplifier according to the present invention.

FIG. 5 depicts a remote amplification architecture with non-failing optical amplifier according to the present invention. As with the non-failing amplifiers employed on the transmit 160 and receive 170 sides of the redundant TTE and non-redundant transmission systems according to the present invention, depicted in FIGS. 2 and 4, a remote amplifier 30 can be excited by two sets of pumps 50. This dual pumping provides increased system power margin when both pumps 50 are operative simultaneously, and provides pump redundancy for continuous system availability in the case of a pump failure. A polarization combiner 500 is used to combine the signals from the two sets of pumps 50 for transmission along the optical fiber 80 to the remote amplifier 30.

In one embodiment of the present invention, a 1480 nm pump signal is used to excite the remote amplifier 30. The passive remote amplifier 30, as well as the passive amplifiers 30 employed on the transmit 160 and receive 170 sides of the transmission systems as shown in FIGS. 2 and 4, can be, for example, erbium-doped fiber amplifiers (EDFAs).

What is claimed is:

1. An optical transmission system, comprising:

(A) a first optical transmitter;

(B) a second optical transmitter;

(C) an optical amplifier;

(D) an optical switch, coupled between the first and second optical transmitters and the optical amplifier;

(E) a first laser pump coupled to the optical amplifier; and (F) a second laser pump coupled to the optical amplifier.

2. The optical transmission system of claim 1 wherein said optical amplifier is simultaneously pumped by said first laser pump and said second laser pump.

3. The optical transmission system of claim 1 wherein said optical amplifier is an erbium-doped fiber amplifier.

4. The optical transmission system of claim 1 wherein said first laser pump and said second laser pump operate at 1480 nanometers.

5. The optical transmission system of claim 1 further comprising a second optical amplifier and a polarization combiner, wherein said second optical amplifier is located remote from said optical amplifier and wherein said first laser pump and said second laser pump are also coupled to said polarization combiner and said polarization combiner is coupled to said second optical amplifier.

6. An optical transmission system, comprising:

a first optical receiver;

a second optical receiver;

an optical amplifier;

an optical coupler, said optical coupler being coupled between said first and second optical receivers and said optical amplifier;

a first laser pump coupled to said optical amplifier; and a second laser pump coupled to said optical amplifier.

7. The optical transmission system of claim 6 wherein said optical amplifier is simultaneously pumped by said first laser pump and said second laser pump.

8. The optical transmission system of claim 6 wherein said optical amplifier is an erbium-doped fiber amplifier.

9. The optical transmission system of claim 6 wherein said first laser pump and said second laser pump operate at 1480 nanometers.

10. The optical transmission system of claim 6 further comprising a second optical amplifier and a polarization combiner, wherein said second optical amplifier is located remote from said optical amplifier and wherein said first laser pump and said second laser pump are coupled to said polarization combiner and said polarization combiner is coupled to said second optical amplifier.

11. An optical transmission system, comprising:

a first optical transmitter, said first optical transmitter transmitting a first optical signal;

a second optical transmitter, said second optical transmitter transmitting a second optical signal;

an optical amplifier;

wherein said first optical signal and said second optical signal are combined onto a single fiber and said combined signals are input to said optical amplifier;

a first laser pump coupled to said optical amplifier; and a second laser pump coupled to said optical amplifier.

12. The optical transmission system of claim 11 wherein said optical amplifier is simultaneously pumped by said first laser pump and said second laser pump.

13. The optical transmission system of claim 11 wherein said optical amplifier is an erbium-doped fiber amplifier.

14. The optical transmission system of claim 11 wherein said first laser pump and said second laser pump operate at 1480 nanometers.

* * * * *